(12) United States Patent
Matsushita et al.

(10) Patent No.: US 12,523,573 B2
(45) Date of Patent: Jan. 13, 2026

(54) ERROR IDENTIFICATION METHOD FOR FIVE-AXIS-CONTROL MACHINE TOOL, NON-TRANSITORY COMPUTER-READABLE STORAGE MEDIUM, AND FIVE-AXIS-CONTROL MACHINE TOOL

(71) Applicant: OKUMA CORPORATION, Niwa-Gun (JP)

(72) Inventors: Tetsuya Matsushita, Niwa-Gun (JP); Takuya Kojima, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 770 days.

(21) Appl. No.: 17/810,907

(22) Filed: Jul. 6, 2022

(65) Prior Publication Data

US 2023/0010557 A1   Jan. 12, 2023

(30) Foreign Application Priority Data

Jul. 8, 2021  (JP) .................................. 2021-113739

(51) Int. Cl.
*G01M 99/00* (2011.01)
*B23Q 15/12* (2006.01)
*G01B 5/012* (2006.01)

(52) U.S. Cl.
CPC ........... *G01M 99/005* (2013.01); *B23Q 15/12* (2013.01); *G01B 5/012* (2013.01)

(58) Field of Classification Search
CPC .. G01M 99/004; G01M 99/005; B23Q 15/12; B23Q 17/00; G01B 5/012; G01B 5/0004; G01B 5/008; G01B 21/042; G05B 2219/50137; G05B 19/401

USPC ............................................. 33/625
See application file for complete search history.

(56) References Cited

U.S. PATENT DOCUMENTS

| | | | | |
|---|---|---|---|---|
| 5,903,459 A | * | 5/1999 | Greenwood | G05B 19/401 700/109 |
| 10,824,131 B2 | * | 11/2020 | Schranz | G01B 5/008 |
| 2011/0040523 A1 | | 2/2011 | Matsushita | |

(Continued)

FOREIGN PATENT DOCUMENTS

| | | |
|---|---|---|
| JP | 2007-101279 A | 4/2007 |
| JP | 2011-038902 A | 2/2011 |
| JP | 2020-046301 A | 3/2020 |

*Primary Examiner* — Kristina M Deherrera
*Assistant Examiner* — Gilbert Bernard Shuster
(74) *Attorney, Agent, or Firm* — BURR PATENT LAW, PLLC

(57) ABSTRACT

An error identification method for identifying an error includes: securing a calibrator having three or more spheres on the table; measuring an initial position of the calibrator with a position measurement sensor tool; calculating a reference angle of each of the rotation axes for positioning the calibrator to a predetermined reference position using a measured value in the measuring; indexing each of the rotation axes individually to a plurality of indexed angles with respect to the reference angle and measuring a center position of a sphere of the calibrator secured on the table at each of the indexed angles with the position measurement sensor tool; and identifying a positioning error and a straightness error of the linear axis, a squareness error between the respective linear axes, and a position error and an inclination error of each of the rotation axes based on a measured value in the indexing.

5 Claims, 14 Drawing Sheets

(56) References Cited

U.S. PATENT DOCUMENTS

| | | | |
|---|---|---|---|
| 2015/0160049 A1* | 6/2015 | Oki | G01D 18/00 |
| | | | 702/97 |
| 2016/0246282 A1* | 8/2016 | Matsushita | G05B 19/404 |
| 2017/0297160 A1* | 10/2017 | Matsushita | B23Q 17/2233 |
| 2019/0361420 A1* | 11/2019 | Sasaki | G05B 19/404 |
| 2021/0132590 A1* | 5/2021 | Kojima | G05B 19/404 |

* cited by examiner

ERROR IDENTIFICATION METHOD FOR FIVE-AXIS-CONTROL MACHINE TOOL, NON-TRANSITORY COMPUTER-READABLE STORAGE MEDIUM, AND FIVE-AXIS-CONTROL MACHINE TOOL

CROSS REFERENCE TO RELATED APPLICATION

This application claims the benefit of Japanese Patent Application Number 2021-113739 filed on Jul. 8, 2021, the entirety of which is incorporated by reference.

FIELD OF THE INVENTION

The disclosure relates to a method for identifying geometric errors in a five-axis-control machine tool, such as a five-axis-control machining center, a non-transitory computer-readable storage medium storing an error identification program for performing the method, and a five-axis-control machine tool configured to perform the method.

BACKGROUND OF THE INVENTION

FIG. 1 is a schematic diagram of a five-axis-control machining center having three linear axes and two rotation axes. A spindle head 2 is allowed to perform a motion of two degrees of freedom for translation with respect to a bed 1 in an X-axis and a Z-axis, which are the linear axes and are orthogonal to one another. A table 3 is allowed to perform a motion of one degree of freedom for rotation with respect to a cradle 4 in a C-axis, which is the rotation axis. The cradle 4 is allowed to perform a motion of one degree of freedom for rotation with respect to a trunnion 5 in an A-axis, which is the rotation axis. The A-axis and the C-axis are orthogonal to one another. Furthermore, the trunnion 5 is allowed to perform a motion of one degree of freedom for translation with respect to the bed 1 in a Y-axis, which is the linear axis and is orthogonal to the X-axis and the Z-axis. Accordingly, the spindle head 2 is allowed to perform a motion of three degrees of freedom for translation and two degrees of freedom for rotation with respect to the table 3. Servomotors, which are controlled by a numerical control unit (not illustrated), drive respective feed axes. A workpiece is secured to the table 3, a tool is mounted on the spindle head 2 and rotated, thus ensuring performing a machining by controlling a relative position and a relative posture between the workpiece and the tool.

As a factor of greatly affecting motion accuracy of the five-axis-control machining center, there are geometric errors between the respective axes, such as an error in center position of the rotation axes that is a displacement from an assumed position and an inclination error of the rotation axes, namely, squareness and parallelism between the axes. For example, in the five-axis-control machining center of FIG. 1, there are three geometric errors of the squareness between the X-axis and the Y-axis, the squareness between the Y-axis and the Z-axis, and the squareness between the Z-axis and the X-axis as inter-axis geometric errors related to the linear axes. There are two geometric errors of the squareness between the tool and the Y-axis and the squareness between the tool and the X-axis as inter-axis geometric errors related to the spindle. There are eight geometric errors of the X-direction error of the C-axis center position, the offset error between the C-axis and the A-axis, the angular offset error of the A-axis, the squareness between the C-axis and the A-axis, the Y-direction error of the A-axis center position, the Z-direction error of the A-axis center position, the squareness between the A-axis and the Z-axis, and the squareness between the A-axis and the Y-axis as inter-axis geometric errors related to the rotation axes.

Even in the linear axes alone, geometric errors of the axes alone, such as a positioning error and a straightness of each axis, are present and become a factor affecting the motion accuracy of the machine.

When the geometric errors are present, the motion accuracy of the machine deteriorates, thus deteriorating processing accuracy of the workpiece. As a countermeasure against the situation, a method for manufacturing or adjusting so as to decrease the geometric errors and a method for correcting and controlling the error of a position of the tool with respect to a work by the geometric errors are generally practiced. In order to perform the correction control, the geometric errors that are internally present in the machine should be measured or identified.

As a method for identifying inter-axis geometric errors, the inventor has proposed a method as disclosed in JP 2011-38902 A. With the method, a table is indexed to a plurality of angles of rotation and inclination by rotation axes, the center position of a sphere secured on the table is each measured using a touch trigger probe mounted on a spindle, and inter-axis geometric errors can be identified from the obtained measured values. Since a sequence of measurements is automatically performed only by installing the spheres on the table and the geometric errors can be automatically identified, the method has an advantage of ensuring identifying the geometric errors even though a machine operator does not have measurement knowledge or technique.

On the other hand, as a method for identifying single axis geometric errors, JP 2007-101279 A discloses a method in which, in a three-dimensional measuring machine, the direction of a step gauge having a plurality of blocks is changed to a plurality of directions to measure respective inter-block distances, thus identifying entire scaling components (first-order components) of the positioning errors of three linear axes and the squarenesses between the three linear axes.

JP 2020-46301 A discloses a method in which, in a machine tool, the direction of a ball array having a plurality of spheres is changed to a plurality of directions to measure respective distances between the plurality of spheres on the ball array using a touch trigger probe mounted on a spindle, thus identifying first-order components of the positioning errors of three linear axes and the squarenesses between the three linear axes.

The touch trigger probe mainly used for JP 2011-38902 A, JP 2007-101279 A, and JP 2020-46301 A is a device that outputs a signal when it comes into contact with an object. When coming into contact with an object, the touch trigger probe outputs a signal, and a control device detects the signal and acquires a detecting position of a position detector of the linear axis at the time of receiving the signal or at the time of considering a delay, thus ensuring measuring the position of the object. In view of this, the measurement result of a sphere by the touch trigger probe is affected by single axis geometric errors, namely, positioning error and straightness of each linear axis.

Accordingly, in the method of JP 2011-38902 A, there is a problem that the inter-axis geometric errors cannot be accurately identified when the single axis geometric errors of each linear axis are large.

On the other hand, in the methods of JP 2007-101279 A and JP 2020-46301 A, there is a problem that, while the first-order components, namely, entire scaling components of the positioning errors of the respective linear axes and the squarenesses between the respective axes can be identified, the identification of the squareness is affected by the straightness of the linear axes.

Further, in order to change the direction of the step gauge and the ball array, it is necessary to change the angle of a jig for installing the step gauge and the ball array, which is a labor for an operator. If the direction is changed to an incorrect direction, a collision accident may be caused. There is also a problem that the jig become expensive when a driving device is installed in a rotation mechanism of the jig.

Therefore, it is an object of the disclosure to provide an error identification method for a five-axis-control machine tool, a non-transitory computer-readable storage medium storing an error identification program, and a five-axis-control machine tool that allow an accurate identification of an inter-axis geometric error without being affected by a single axis geometric error of a linear axis and ensure automatically performing an identification of the single axis geometric error of the linear axis and the inter-axis geometric error without knowledge or measurement skills of a machine operator.

SUMMARY OF THE INVENTION

In order to achieve the above-described object, there is provided an error identification method for identifying an error of a five-axis-control machine tool according to a first configuration of the disclosure. The five-axis-control machine tool includes a spindle rotatable with a tool mounted thereon, a table configured to secure a workpiece and/or a jig, three linear axes orthogonal to one another and configured to relatively move the spindle with respect to the table, and two rotation axes configured to turn and/or incline the table. The error identification method includes: mounting a position measurement sensor tool on the spindle and securing a calibrator having three or more spheres on the table; measuring an initial position of the calibrator with the position measurement sensor tool; calculating a reference angle of each of the rotation axes for positioning the calibrator to a predetermined reference position using a measured value in the measuring; indexing each of the rotation axes individually to a plurality of indexed angles with respect to the reference angle and measuring a center position of a sphere of the calibrator secured on the table at each of the indexed angles with the position measurement sensor tool; and identifying a positioning error and a straightness error of the linear axis, a squareness error between the respective linear axes, and a position error and an inclination error of each of the rotation axes based on a measured value in the measuring.

In another aspect of the first configuration of the disclosure, which is in the above configuration, the error identifying includes identifying a positioning error and a straightness error of two of the linear axes, three squareness errors of the linear axes, a scaling component of a positioning error of one of the linear axes other than the two of the linear axes, and a position error and an inclination error of each of the rotation axes by using a measured value in the calibrator measuring.

In another aspect of the first configuration of the disclosure, which is in the above configuration, the calibrator measuring includes, while one of the rotation axes is indexed to a given indexed angle such that a sphere of the calibrator draws an arc trajectory, indexing the other of the rotation axes sequentially to a plurality of the indexed angles and measuring each center position of at least one sphere of the calibrator.

In another embodiment of the first configuration of the disclosure, which is in the above configuration, the calibrator measuring includes: a parallel measuring of indexing each of the rotation axes such that a direction of the calibrator is parallel to each of axis lines of two of the linear axes and measuring each center of three or more spheres of the calibrator with the position measurement sensor tool; and a plane diagonal measuring of indexing each of the rotation axes such that a direction of the calibrator is in a diagonal direction of a plane formed by axis lines of two of the linear axes and measuring center positions of three or more spheres of the calibrator with the position measurement sensor tool.

In another embodiment of the first configuration of the disclosure, which is in the above configuration, the calibrator measuring includes: a parallel measuring of individually indexing each of the rotation axes such that a direction of the calibrator is parallel to each of axis lines of two of the linear axes and measuring each center position of three or more spheres of the calibrator with the position measurement sensor tool, and a plane diagonal measuring of individually indexing each of the rotation axes such that a direction of the calibrator is in a diagonal direction of a space formed by axis lines of the three linear axes and measuring each center position of three or more spheres of the calibrator with the position measurement sensor tool.

In order to achieve the above-described object, a second configuration of the disclosure is a non-transitory computer-readable storage medium storing an error identification program for a five-axis-control machine tool for causing a numerical control unit of the five-axis-control machine tool to perform the error identification method for the five-axis-control machine tool. The five-axis-control machine tool includes a spindle rotatable with a tool mounted thereon, a table configured to secure a workpiece and/or a jig, three linear axes orthogonal to one another and configured to relatively move the spindle with respect to the table, and two rotation axes configured to turn and/or incline the table.

In order to achieve the above-described object, a third configuration of the disclosure is a five-axis-control machine tool including: a spindle rotatable with a tool mounted thereon; a table configured to secure a workpiece and/or a jig; three linear axes orthogonal to one another and configured to relatively move the spindle with respect to the table; and two rotation axes configured to turn and/or incline the table. The five-axis-control machine tool includes an initial position measuring unit configured to measure an initial position of a calibrator having three or more spheres and secured on the table with a position measurement sensor tool mounted on the spindle, a reference angle calculating unit configured to calculate a reference angle of each of the rotation axes for positioning the calibrator to a predetermined reference position using a measured value by the initial position measuring unit, a calibrator measuring unit configured to index each of the rotation axes individually to a plurality of indexed angles with respect to the reference angle and measuring a center position of a sphere of the calibrator secured on the table at each of the indexed angles with the position measurement sensor tool, and an error identifying unit configured to identify a positioning error and a straightness error of the linear axis, a squareness error between the respective linear axes, and a position error and an inclination error of each of the rotation axes based on a measured value by the calibrator measuring unit.

With the disclosure, the single axis geometric errors, namely, positioning errors and straightnesses of the linear axes of the five-axis-control machine tool and the inter-axis geometric errors, namely, squarenesses between the linear axes, center errors of the rotation axes, and inclination errors of the rotation axes can be simultaneously identified. Accordingly, the accurate identification of the inter-axis geometric errors is allowed without being affected by the single axis geometric errors of the linear axes.

Furthermore, by exploiting the rotation axes of the five-axis-control machine tool, a sequence of measurements can be automatically performed, and the identification of the single axis geometric errors and the inter-axis geometric errors of the linear axes can also be automatically performed without knowledge or measurement skills of a machine operator.

DETAILED DESCRIPTION OF THE INVENTION

The following describes an embodiment of the disclosure based on the drawings.

Figure 1:
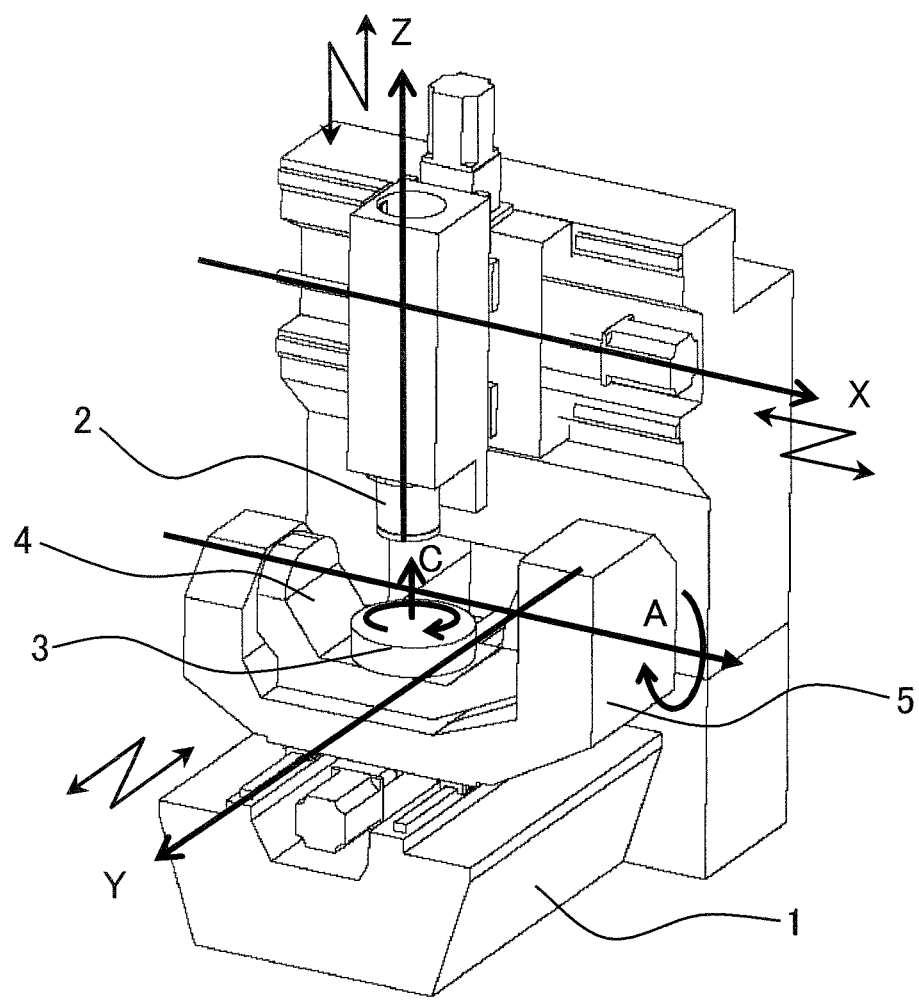
FIG. 1 is a schematic diagram of a five-axis-control machining center.
Figure 2:
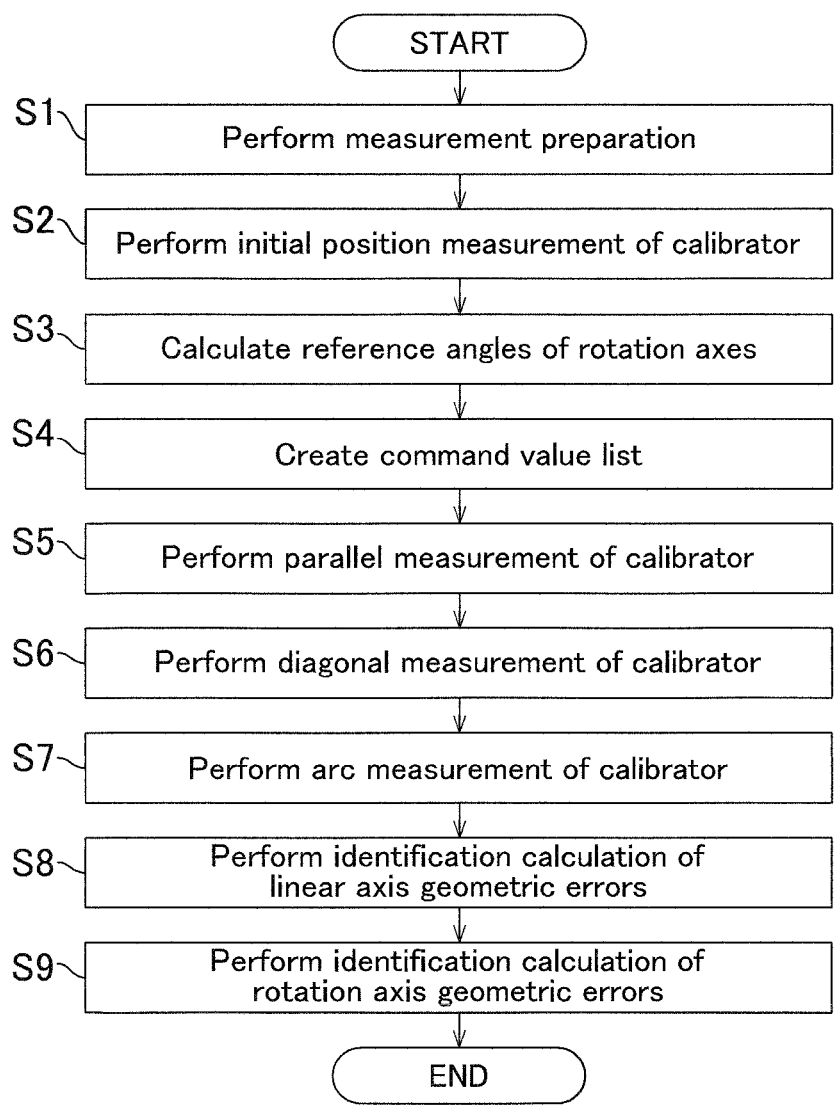
FIG. 2 is a flowchart of an error identification method.

In the embodiment, one example of a five-axis-control machine tool that performs an error identification method of the disclosure is the five-axis-control machining center of FIG. 1 described above. Therefore, overlapping descriptions are omitted. The five-axis-control machining center includes an initial position measuring unit, a reference angle calculating unit, a calibrator measuring unit, and an error identifying unit of the disclosure, and performs the error identification method of the disclosure in accordance with an error identification program stored in a numerical control unit. The following describes a procedure of the error identification method based on a flowchart in FIG. 2.

Figure 3:
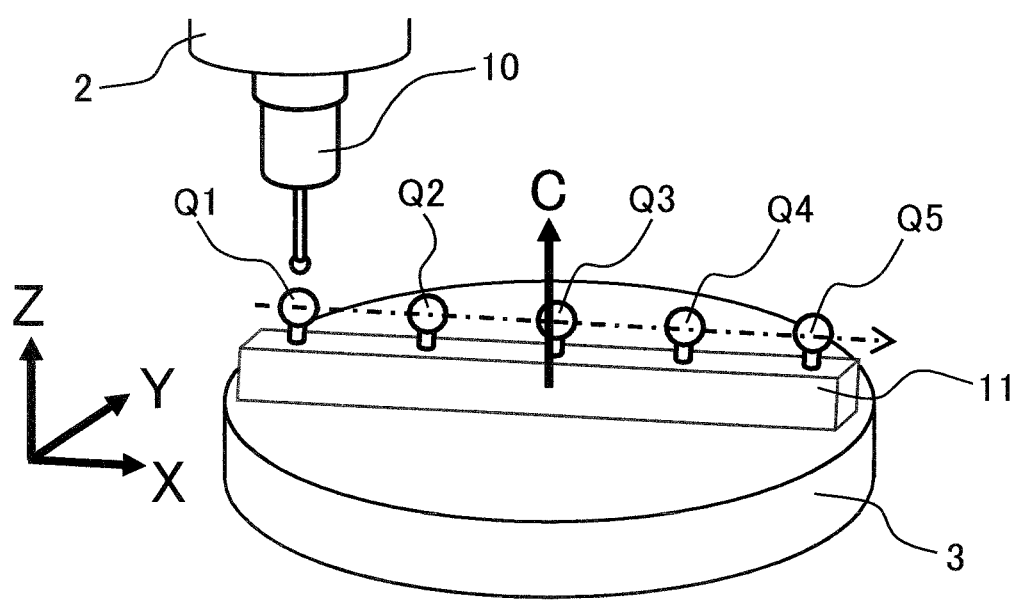
FIG. 3 is a schematic diagram of a touch trigger probe and a ball array.

First, in Step (hereinafter referred to as simply "S") 1, preparation for a measurement is performed. Specifically, as illustrated in FIG. 3, a touch trigger probe 10 is mounted on a spindle head 2. A ball array 11 that is a calibrator to which a sphere Q1 to a sphere Q5 are secured is attached to a table 3. Furthermore, a feed axis is operated such that the tip of the touch trigger probe 10 is positioned approximately directly above the sphere Q1. S1 is a preparing step.

Next, in S2, a measurement of the initial position of the ball array 11 is performed. S2 is an initial position measuring step. The respective center positions of the sphere Q1 and the sphere Q2 are measured by the touch trigger probe 10.

Here, the touch trigger probe 10 is a detector that outputs a trigger signal when the sphere of the tip comes into contact with an object, and the numerical control unit that receives the trigger signal acquires current positions of X-axis, Y-axis, and Z-axis at the receiving timing, thus ensuring measuring the position of the object. The center position of a sphere can be measured by coming into contact with the sphere at four points or more. On the other hand, the center position of sphere can be measured by coming into contact with three points or more when the diameter of the sphere is known.

Figure 5:
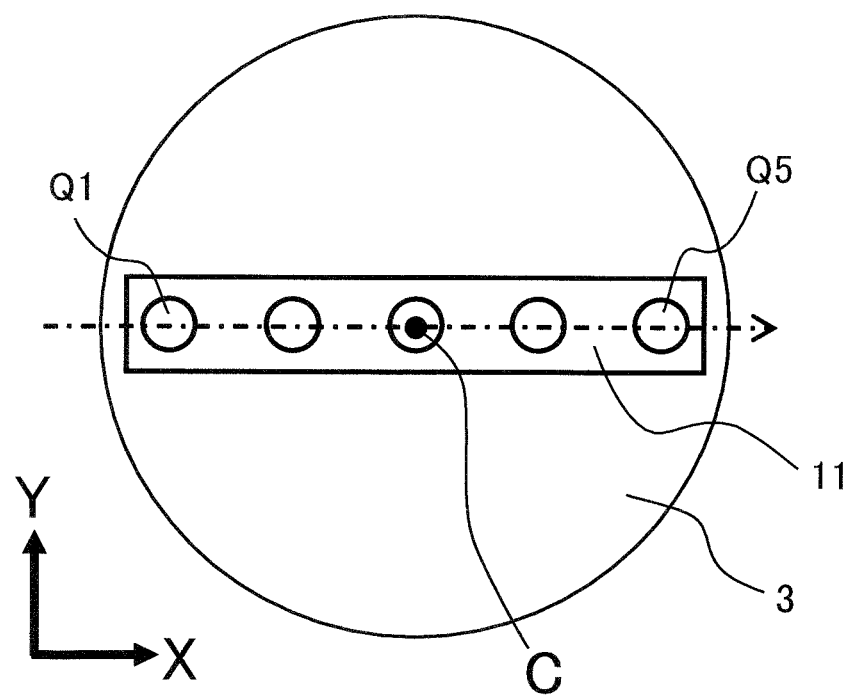
FIG. 5 is a schematic diagram of a position of the ball array in an X-axis parallel direction measurement.

Next, in S3, reference angles of rotation axes where the ball array 11 comes in a reference position is calculated using the measured value of the initial position. S3 is a reference angle calculating step. Here, the reference position of the ball array 11 is in a state where the ball array 11 is parallel to the X-axis as illustrated in FIG. 5. Accordingly, a reference angle $A_O$ of an A-axis is 0°, namely, a C-axis is parallel to the Z-axis, and a reference angle of the C-axis is a C-axis angle where the ball array 11 is parallel to the X-axis.

Figure 4:
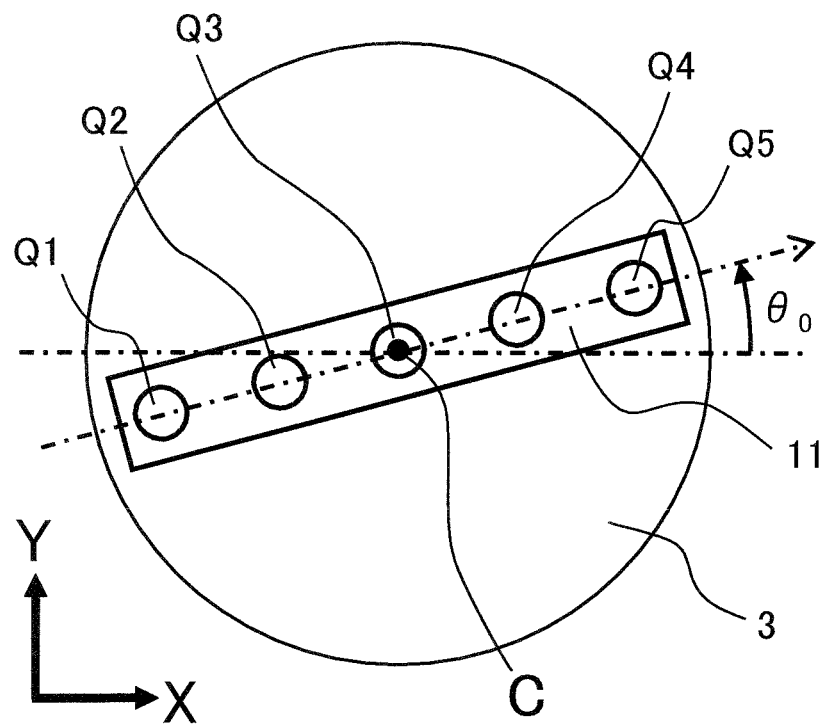
FIG. 4 is a schematic diagram of an initial installation position of the ball array.

When the A-axis is in a state of being 0° and the ball array 11 is installed on the table 3 as illustrated in FIG. 4, an installation angle $\theta_0$ of the ball array 11 is obtained by the following Math. 1, where PI1=(XI1, YI1, ZI1) denotes a measured center coordinate value of the sphere Q1, PI2=(XI2, YI2, ZI2) denotes a center coordinate value of the sphere Q2, and VX=(1, 0, 0) denotes a unit vector parallel to the X-axis. A C-axis reference angle $C_O$ is obtained by the following Math. 2, where $C_C$ denotes the C-axis angle at the time of the initial position measurement.

$$\theta_0 = \tan^{-1}\{(VP \times VX)/(VP \cdot VX)\}$$

Here, $VP=(PI2-PI1)/|PI2-PI1|$ [Math. 1]

$$C_O = C_C + \theta_0$$ [Math. 2]

Next, in S4, a command value list of the respective axes is created based on calibration values of the center positions of the respective spheres of the ball array 11, the ball array installation angle $\theta_0$, the reference angles of the respective rotation axes, and the respective rotation axis angles for achieving a preset measurement position.

Next, in S5 to S7, the respective rotation axes are indexed in accordance with the created command value list, and the center positions of the spheres on the ball array 11 are measured at each position. S5 to S7 are regarded as a calibrator measuring step. Each command position of the command value list is checked to see whether it is within an operating range of each axis, and when it is out of the range, the command position may be deleted or omitted, or an alarm may be output.

In S5, the rotation axes are indexed such that the direction of the ball array 11 is parallel to each of the X-axis and the Y-axis, and the measurement of the center positions of the spheres Q1 to Q5 of the ball array 11 is performed. S5 is a parallel measuring step in the calibrator measuring step.

In the case of being parallel to the X-axis, as illustrated in FIG. 5, the A-axis angle is indexed to $A_O$ and the C-axis angle is indexed to $C_O$ to perform the measurement.

Figure 6:
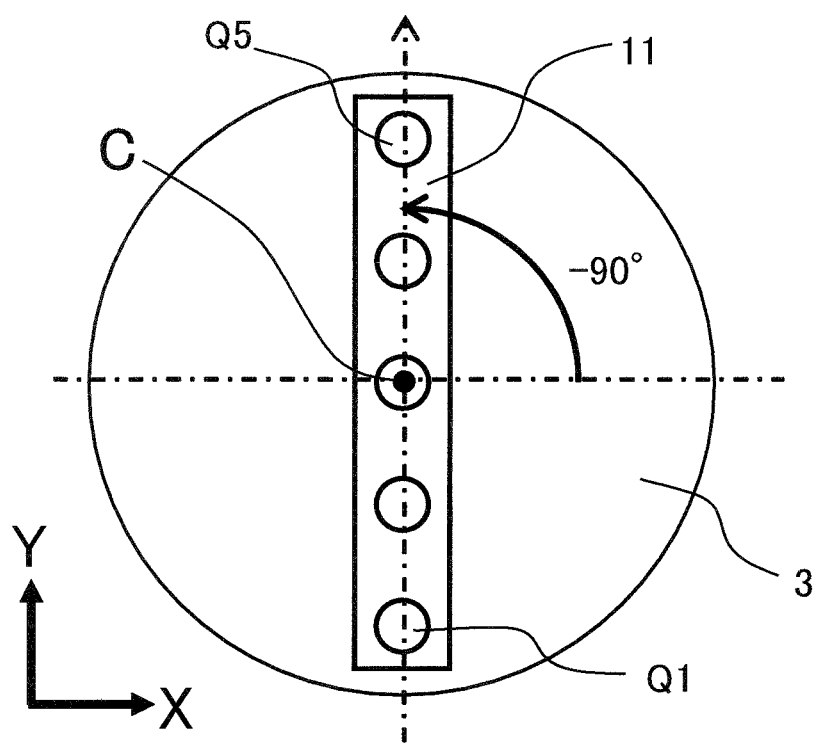
FIG. 6 is a schematic diagram of a position of the ball array in a Y-axis parallel direction measurement.

In the case of being parallel to the Y-axis, as illustrated in FIG. 6, the A-axis angle is indexed to $A_O$ and the C-axis angle is indexed to $C_O-90°$ to perk), in the measurement.

In S6, the rotation axes are indexed such that the direction of the ball array 11 is parallel to diagonal directions of the two linear axes, and the measurement of the center positions of the spheres Q1 to Q5 of the ball array 11 is performed. S6 is a plane diagonal measuring step in the calibrator measuring step.

Figure 7:
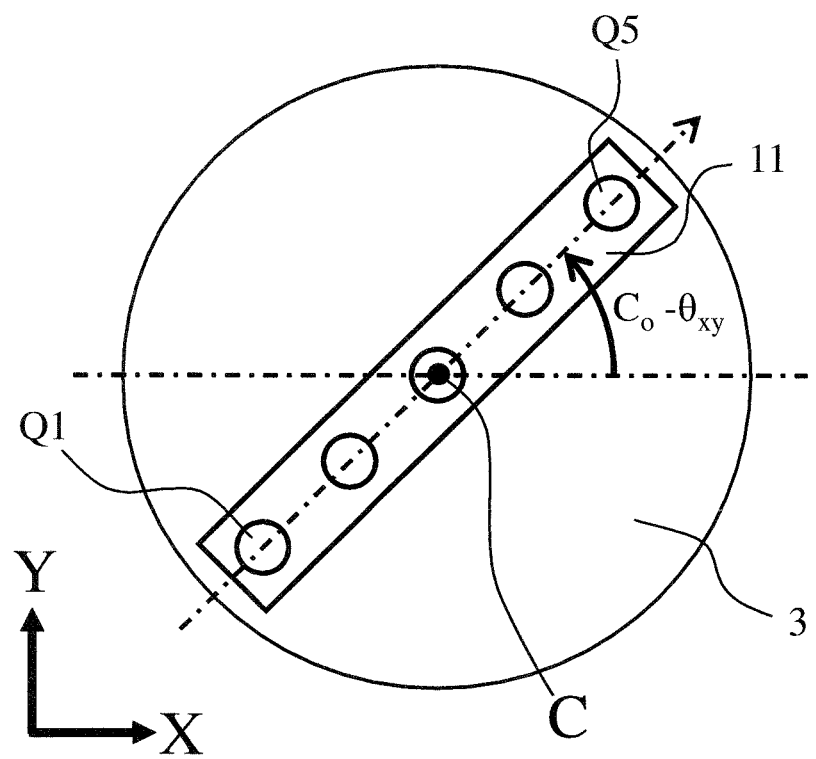
FIG. 7 is a schematic diagram of a position of the ball array in a diagonal direction measurement of the X-axis and the Y-axis.

In the case of the diagonal direction of the X-axis and Y-axis, as illustrated in FIG. 7, the A-axis angle is indexed to $A_O$ and the C-axis angle is indexed to $C_O-\theta xy$. The measurement in the two directions is performed by setting $\theta xy$ to $\pm 45°$. The measurement in any one of the directions may be performed.

Figure 8:
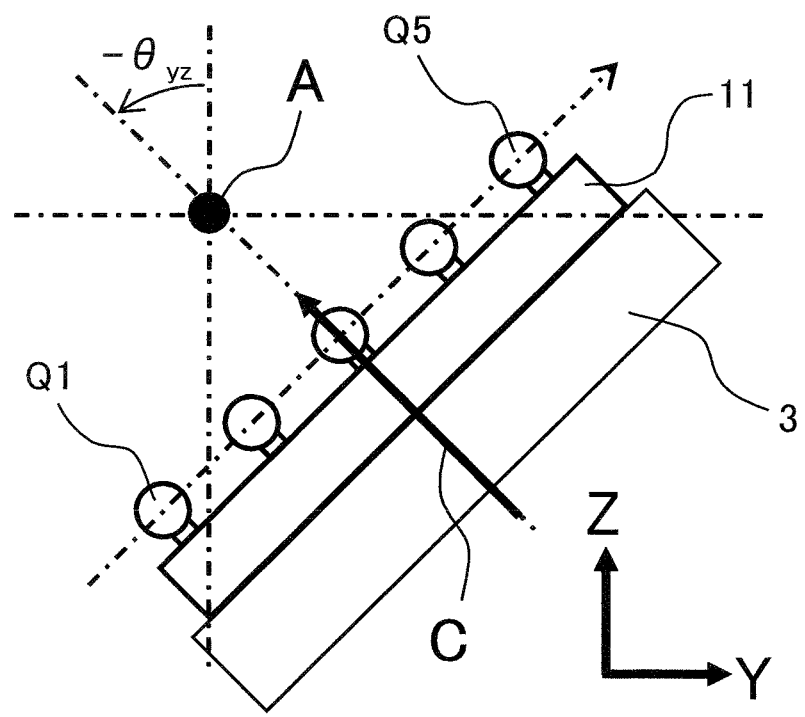
FIG. 8 is a schematic diagram of a position of the ball array in a diagonal direction measurement of the Y-axis and a Z-axis.

In the case of the diagonal direction of the Y-axis and the Z-axis, as illustrated in FIG. 8, the A-axis angle is indexed to $A_O-\theta yz$, and the C-axis angle is indexed to $C_O-90°$. The measurement in the two directions is performed by setting $\theta yz$ to $\pm 45°$. The measurement in any one of the directions may be performed. However, when all the spheres of the ball array 11 cannot be measured by the relationship between the range of motion of the Z-axis and the center position of the A-axis, the absolute value of $\theta yz$ is set to a smaller value. In this case, since an identification error in S8 increases as the value approaches 0°, it is preferred to set it to the largest possible value. Although an identification calculation is possible in S8 as long as two or more spheres can be measured, the identification error increases as the largest value of the distance between the measured spheres decreases.

Figure 9:
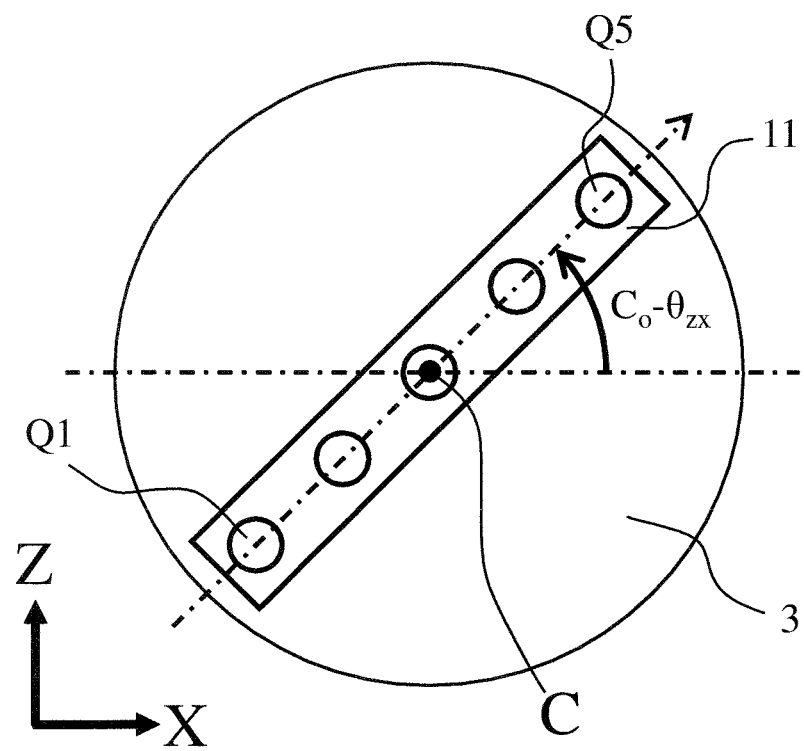
FIG. 9 is a schematic diagram of a position of the ball array in a diagonal direction measurement of the Z-axis and the X-axis.

In the case of the diagonal direction of the Z-axis and the X-axis, as illustrated in FIG. 9, the A-axis angle is indexed to $A_O-90°$ and the C-axis angle is indexed to $C_O-\theta zx$. The measurement in the two directions is performed by setting $\theta zx$ to $\pm 45°$. However, in the touch trigger probe 10 as illustrated in FIG. 3, the touch trigger probe 10 and the spindle head 2 interfere with the ball array 11, and only a part of the spheres can be measured. In view of this, the identification error in S8 increases. Since there is a sphere that cannot be measured by the relationship between the range of motion of the Z-axis and the center position of the A-axis, the absolute value of $\theta zx$ is set to a smaller value in that case. Although the identification calculation is possible in S8 as long as two or more spheres can be measured, the identification error increases as the largest value of the distance between the measured spheres decreases.

Figure 10:
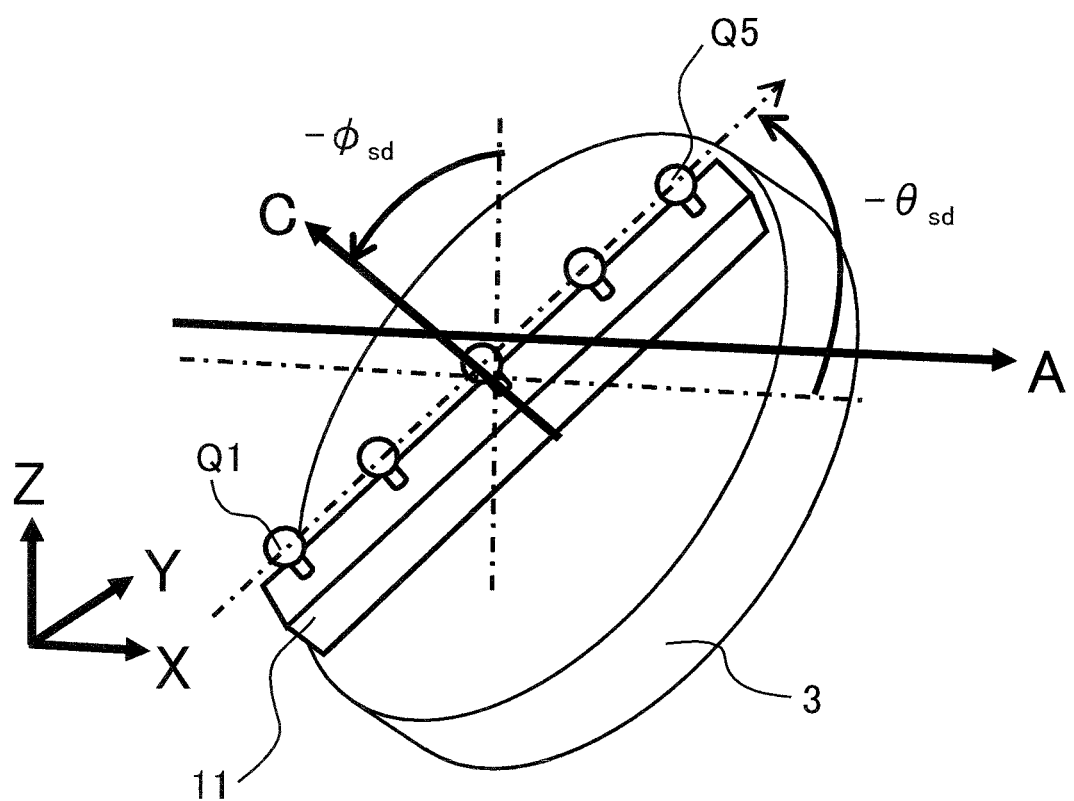
FIG. 10 is a schematic diagram of a position of the ball array in a diagonal direction measurement in space.

Instead of the measurement in the diagonal direction of the Z-axis and the X-axis, a measurement in a space diagonal direction of the X-axis, the Y-axis, and the Z-axis as illustrated in FIG. 10 may be performed. This step is a space diagonal direction measuring step in the calibrator measuring step. In this case, the A-axis angle is indexed to $A_O-\varphi sd$, and the C-axis angle is indexed to $C_O-\theta sd$. The measurement in the two directions is performed by setting $\varphi sd$ to $-45°$ and $\theta sd$ to $\pm 45°$. Here, when there is a sphere that cannot be measured by the relationship between the range of motion of the Z-axis and the center position of the A-axis, the absolute value of at least any one of $\varphi sd$ and $\theta sd$ is set to a smaller value. In this case, since the identification error in S8 increases as the value approaches 0°, it is preferred to set it to the largest possible value. Although the identification calculation is possible in S8 as long as two or more spheres can be measured, the identification error increases as the largest value of the distance between the measured spheres decreases.

While each diagonal direction measurement is set to be performed in the two directions, only the measurement in any one of the directions may be performed.

Meanwhile, without performing the measurements in the diagonal direction of the X-axis and the Y-axis, the diagonal direction of the Y-axis and the Z-axis, and the diagonal direction of the Z-axis and the X-axis, the measurement in the space diagonal direction may be performed in four directions. In this case, when the A-axis angle is set to $A_O-\varphi sd$ and the C-axis angle is set to $C_O-\theta sd$, the measurement is performed by setting $\varphi sd$ to $\pm 45°$ and $\theta sd$ to $\pm 45°$.

In S7, in a state where one of the two rotation axes is indexed to a given angle such that the spheres on the ball array 11 draw arc trajectories, the other of the rotation axes is sequentially indexed to a plurality of angles to perform a measurement of the center position of the sphere Q5 on the ball array 11. S7 is an arc measuring step in the calibrator measuring step.

Figure 11:
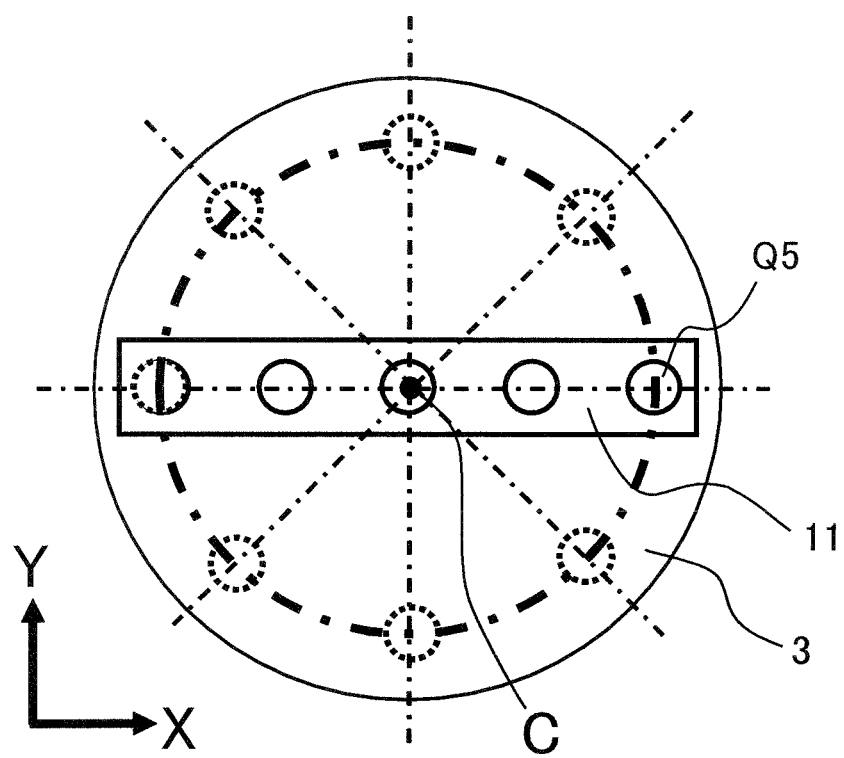
FIG. 11 is a schematic diagram of a position of ball array spheres in an arc measurement centering around a C-axis.

In the arc measurement centering around the C-axis, as illustrated in FIG. 11, the A-axis angle is indexed to $A_O$ and the C-axis angle is indexed to a plurality of angles from $C_O$ to perform the measurement of the center position of the sphere Q5 at the respective angles.

Figure 12:
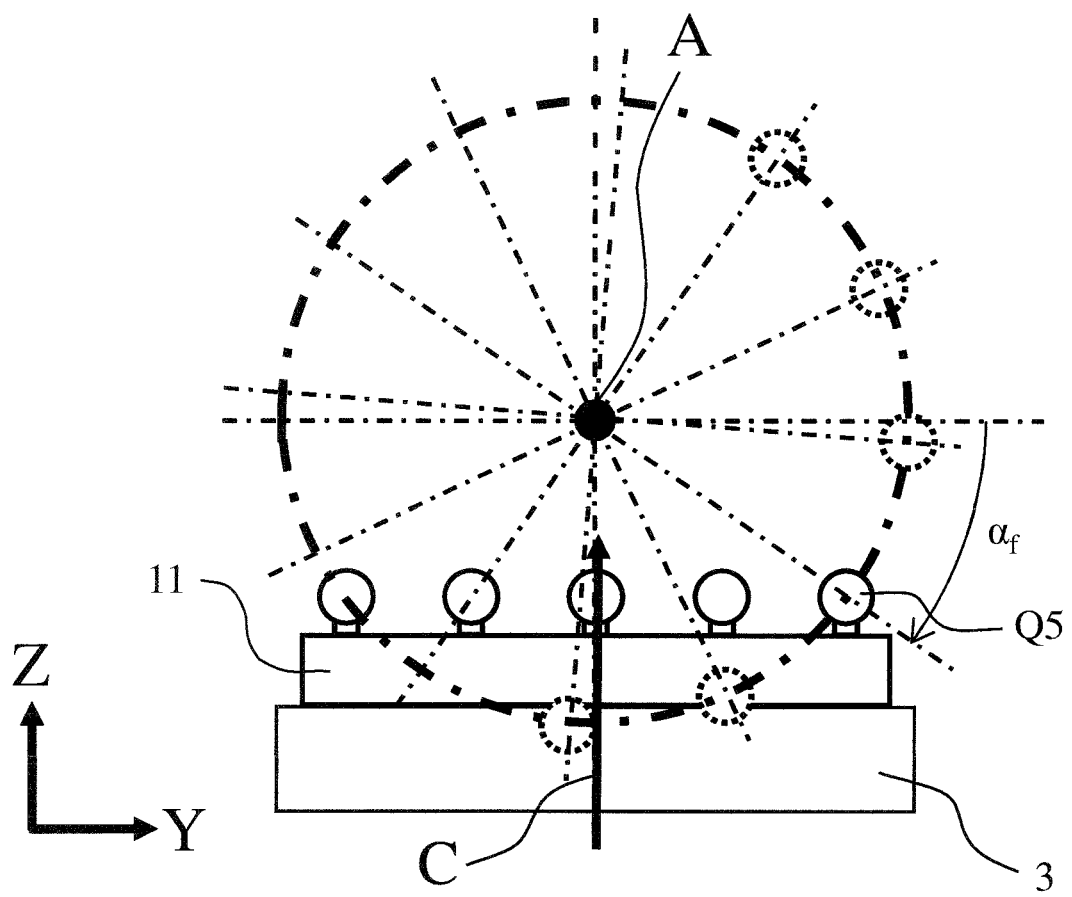
FIG. 12 is a schematic diagram of a position of the ball array spheres in an arc measurement centering around an A-axis.

In the arc measurement centering around the A-axis, as illustrated in FIG. 12, the C-axis angle is indexed to $C_O-90°$ and the A-axis angle is indexed from $A_O-\varphi ra$ at the pitch of $\Delta\varphi ra$ to perform the measurement of the center position of the sphere Q5 at the respective angles. An offset angle of the sphere Q5 center position on the YZ plane is denoted as $\alpha f$ illustrated in FIG. 12.

Instead of measuring the sphere Q5, another sphere from Q1 to Q4 may be measured. A plurality of spheres may be measured.

In S8, the measured values of S5 and S6 are used to perform the identification calculation of the geometric errors of the linear axes. S8 is an error identifying step. Details will be described below.

In S9, the measured values of S7 and the geometric error identification values of the linear axes identified in S8 are used to perform the identification calculation of the geometric errors of the rotation axes. S9 is an error identifying step. Details will be described below.

Figure 13:
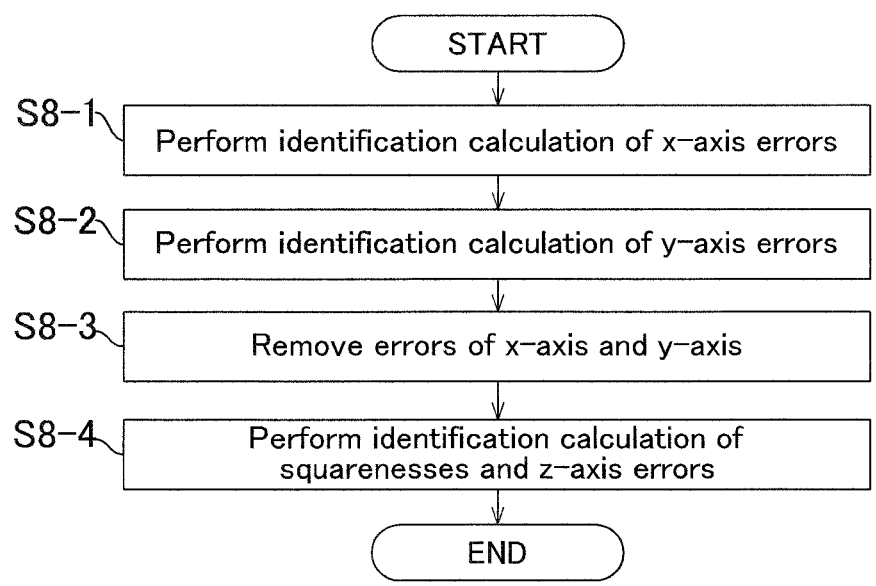
FIG. 13 is a detailed flowchart of S8.

The details of S8 will be described based on a flowchart in FIG. 13.

In S8-1, the X-axis errors, namely, positioning error and straightness are identified.

Assuming that the center position of each sphere of the ball array 11 is calibrated by a three-dimensional measuring machine and the like, a vector of the calibration value of the center position of a sphere Qi (i=1 to 5) is set to MOi=(XMi, YMi, ZMi). The vector is three-dimensional coordinate value of the center of each sphere in the coordinate system of the ball array 11 with the center of the sphere Q1 as the origin. Here, the calibration value may be corrected according to the temperature of the ball array 11.

An X-axis parallel measurement error vector DPXi= (dXPXi, dYPXi, dZPXi) of each sphere is expressed by the following formula, where PPXi=(XPXi, YPXi, ZPXi) denotes a center position measured value vector of the sphere Qi in the X-axis parallel measurement in S5.

$$DPXi = PPXi - PPX1 - MOi \qquad \text{[Math. 3]}$$

An X-axis positioning error EXX(x) is obtained by the following formula, where FXX(x) denotes an n-th approximated curve of dXPXi.

$$EXX(x)=FXX(x) \qquad \text{[Math. 4]}$$

An X-axis straightness Y component EYX(x) is obtained by the following formula, where SYX(x) and FYX(x) respectively denote a least squares straight line and an n-th approximated curve (n≥2) of dYPXi.

$$EYX(x)=FYX(x)-SYX(x) \qquad \text{[Math. 5]}$$

An X-axis straightness Z component EZX(x) is obtained by the following formula, where SZX(x) and FZX(x) respectively denote a least squares straight line and an n-th approximated curve (n≥2) of dZPXi.

$$EZX(x)=FZX(x)-SZX(x) \qquad \text{[Math. 6]}$$

Next, in S8-2, the Y-axis errors, namely, positioning error and straightness are identified.

A calibration value vector MOi of the center position of each sphere is rotated by 90° around the Z-axis with the center of the sphere Q1 as the center and a calibration value vector after the rotation is denoted as MYi.

A Y-axis parallel measurement error vector DPYi= (dXPYi, dYPYi, dZPYi) of each sphere is expressed by the following formula, where PPYi=(XPYi, YPYi, ZPYi) denotes a center position measured value vector of the sphere Qi in the Y-axis parallel measurement in S5.

$$DPYi=PPYi-PPY1-MYi \qquad \text{[Math. 7]}$$

A Y-axis positioning error EYY(y) is obtained by the following formula, where FYY(y) denotes an n-th approximated curve of dYPYi.

$$EYY(y)=FYY(y) \qquad \text{[Math. 8]}$$

A Y-axis straightness Z component EZY(y) is obtained by the following formula, where SZY(y) and FZY(y) respectively denote a least squares straight line and an n-th approximated curve (n≥2) of dZPYi.

$$EZY(y)=FZY(y)-SZY(y) \qquad \text{[Math. 9]}$$

A Y-axis straightness X component EXY(y) is obtained by the following formula, where SXY(y) and FXY(y) respectively denote a least squares straight line and an n-th approximated curve (n≥2) of dXPYi.

$$EXY(y)=FXY(y)-SXY(y) \qquad \text{[Math. 10]}$$

Next, in S8-3, influence of the X-axis and Y-axis errors identified in S8-1 and S8-2 are removed from the measured values of the diagonal direction measurements.

A measured value vector after correcting the center position of each sphere CDji=(XCji, YCji, ZCji) in which the positioning errors and the straightnesses of the X-axis and the Y-axis are corrected is obtained by the following formula, where PDji=(XDji, YDji, ZDji) denotes a center position measured value vector of the sphere Qi (i=1 to 5) in a j-th diagonal direction measurement in S6.

$$XCji=XDji-\{EXX(XDji)+EXY(YDji)\}$$

$$YCji=YDji-\{EYX(XDji)+EYY(YDji)\}$$

$$ZCji=ZDji-\{EZX(XDji)+EZY(YDji)\} \qquad \text{[Math. 11]}$$

Next, in S8-4, the squarenesses between the respective axes and the z-axis error, namely, positioning error scaling (gradient) component are obtained.

A calibration value vector of the center position of the sphere Qi (i=1 to 5) in the j-th diagonal direction measurement in S6 is rotated by the C-axis and the A-axis with the center of the sphere Q1 as the center, and a calibration value vector after the rotation is denoted as MDji=(XMDji, YMDji, ZMDji). Then, an error vector of the diagonal direction measurement DDji=(dXDji, dYDji, dZDji) is expressed by the following formula.

$$DDji=CDji-CDj1-MDji \qquad \text{[Math. 12]}$$

The A-axis angle in the j-th diagonal direction measurement is set to $A_O+\alpha j$ and the C-axis angle is set to $C_O+\gamma j$. A unit vector in the longitudinal direction of the ball array 11 in this case is VDj=(cos γj, −cos αj·sin γj, sin αj·sin γj), and a gradient component dLji of an error of an inter-center distance between the center of the sphere Q1 and the center of each sphere is obtained by the following formula. Here, i=2 to 5.

$$dLji=(DDji-DDj1)\cdot VDj/(XMi-XM1) \qquad \text{[Math. 13]}$$

Relational expressions of a YZ squareness EAYZ, a ZX squareness EBZX, an XY squareness ECXY, and a Z-axis positioning error scaling component KZ with respect to dLji are expressed by the following formulas.

$$dLji=Sj1*KZ+Sj2*EAYZ+Sj3*EBZX+Sj4*ECXY$$

$$Sj1=-\sin^2\alpha j*\sin^2\gamma j$$

$$Sj2=-\sin 2\alpha j*\sin^2\gamma j/2$$

$$Sj3=-\sin \alpha j*\sin 2\gamma j/2$$

$$Sj4=-\cos \alpha j*\sin 2\gamma j/2 \qquad \text{[Math. 14]}$$

By solving Math. 14 as simultaneous equations, EAYZ, EBZX, ECXY, and KZ can be obtained. For example, EAYZ, EBZX, ECXY, and KZ are obtained by the following formula, where XX denotes a vector with KZ, EAYZ, EBZX, and ECXY as components, BB denotes a vector with dLji as a component, and AA denotes a matrix with Sj1 to Sj4 as components.

$$XX=(AA^T*AA)^{-1}*AA^T*BB \qquad \text{[Math. 15]}$$

The errors may be calculated separately. In this case, influence of other errors and errors not subject to identification can be eliminated.

Only the XY squareness is identified only from the measurement result of the XY diagonal direction measurement. When θxy=±45°, that is, α1=0°, γ1=−45° and α2=0°, γ2=−45°, the XY squareness is obtained by the following formula. Here, mean( ) is a function for calculating a mean value. The calculation is not affected by the Z-axis errors and the Z-direction errors of the X-axis and the Y-axis.

$$ECXY=\text{mean}(-dL1i+dL2i) \qquad \text{[Math. 16]}$$

Next, from the measurement result of the YZ diagonal direction measurement, the YZ squareness EAYZ and the Z-axis positioning error scaling component KZ are identified. When θyz=±45°, that is, α3=−45°, γ3=−90° and α4=45°, −γ4=−90°, the YZ squareness EAYZ and the Z-axis positioning error scaling component KZ are obtained by the following formulas. The case is not affected by the X-axis errors and the X-direction errors of the Y-axis and the Z-axis.

$$KZ=\text{mean}(-dL3i-dL4i)$$

$$EAYZ=\text{mean}(dL3i-dL4i) \qquad \text{[Math. 17]}$$

Next, from the result of the space diagonal direction measurement, the ZX squareness EBZX is identified. When φsd=45°, θsd=±45°, that is, α5=−45°, γ5=−45°, and α6=−45°, γ6=45°, the ZX squareness EBZX is obtained by the following formula.

$$EBZX=(2^0.5)*\text{mean}(-dL5i+dL6i) \qquad \text{[Math. 18]}$$

Figure 14:
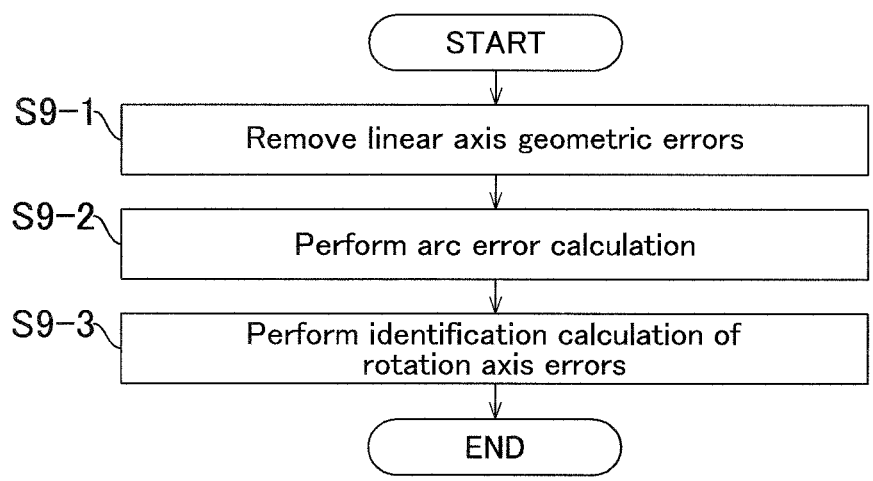
FIG. 14 is a detailed flowchart of S9.

Next, the details of S9 will be described based on a flowchart in FIG. 14.

In S9-1, influence of linear axis geometric errors, namely, influence of the positioning errors and straightnesses of the X-axis, the Y-axis, and the Z-axis and the squarenesses between the respective axes identified in S8 is removed from the sphere center measured positions measured in S7.

A center position measured value vector of the sphere Q5 at a k-th indexed angle in a j-th arc measurement, here, j=1 is for an arc measurement centering around C-axis, and j=2 is for an arc measurement centering around the A-axis, is assumed to be PRjk=(XRjk, YRjk, ZRjk). A measured value vector ager correcting the center position of each sphere CLjk=(XLjk, YLjk, ZLjk) in which the positioning errors of the X-axis, the Y-axis, and the Z-axis, the straightnesses of the X-axis and the Y-axis, and the squarenesses between the respective axes are removed is obtained by the following formula.

$XLjk=XRjk-\{EXX(XRjk)+EXY(YRjk)-ECXY*YRjk+EBZX*ZRjk\}$ $YLjk=YRjk-\{EYX(XR/k)+EYY(YRjk)-EAYZ*ZRjk\}$ $ZLjk=ZRjk-\{EZX(XRjk)+EZY(YRjk)+KZ*ZRjk\}$ [Math. 19]

In S9-2, arc errors of respective sphere center position measured value groups measured by indexing the rotation axes so as to draw the arc trajectories in S7 are obtained. The arc errors are a radial error, and a lateral direction and a vertical direction of a center offset, which can be expressed by a zero-order coefficient of a Fourier coefficient, a first-order cosine coefficient, and a first-order sine coefficient, respectively.

In the arc measurement centering around the C-axis in S7, the A-axis angle is fixed to $A_O$ and the C-axis angle is indexed to $C_O+\gamma ck$ (k=1 to nc) to perform the measurement. Here, $\gamma ck=\Delta\theta ra*(k-1)$.

An axial direction error EA1k, a radial direction error ER1k, and a tangential direction error ET1k in the C-axis arc measurement are obtained by the following formulas, where PO1k=(XO1k, YO1k, ZO1k) denotes a command position of the center of the sphere Q5 at the k-th indexed angle of the j-th measurement condition, and VA1k, VR1k, and VT1k respectively denote an axial direction vector, a radial direction vector, and a tangential direction vector of the C-axis.

$EA1k=(CL1k-PO1k)\cdot VA1k$ $ER1k=(CL1k-PO1k)\cdot VR1k$ $ET1k=(CL1k-PO1k)\cdot VT1k$ [Math. 20]

Relationships of EA1k, ER1k, and ET1k with respect to the respective Fourier coefficients can be expressed by the following formulas, where A0A1, A1A1, and B1A1 denote Fourier coefficients of axial direction components, A0R1, A1R1, and B1R1 denote Fourier coefficients of radial direction components, and A0T1, A1T1, and B1T1 denote Fourier coefficients of tangential direction components. By solving the formulas as simultaneous equations of nc pieces of formulas in the respective directions, the arc errors in the respective directions in the C-axis arc measurement can be obtained.

$EA1k=A0A1+A1A1*\cos \gamma ck+B1A1*\sin \gamma ck$ $ER1k=A0R1+A1R1*\cos \gamma ck+B1R1*\sin \gamma ck$ $ET1k=A0T1+A1T1*\cos \gamma ck+B1T1*\sin \gamma ck$ [Math. 21]

In the arc measurement centering around the A-axis in S7, the C-axis angle is fixed to $C_O-90°$ and the A-axis angle is indexed to $A_O+\alpha ck$ (k=1 to na) to perform the measurement. Here, $\alpha ck=-\varphi ra-\Delta\varphi ra(k-1)-\alpha f$, here, $\alpha f$ denotes an offset angle of the center position of the sphere Q5 on the YZ plane.

An axial direction error EA2k, a radial direction error ER2k, and a tangential direction error ET2k in the A-axis arc measurement are obtained by the following formulas, where PO2k=(XO2k, YO2k, ZO2k) denotes a command position of the center of the sphere Q5 at the k-th indexed angle of the j-th measurement condition, and VA2k, VR2k, and VT2k respectively denote an axial direction vector, a radial direction vector, and a tangential direction vector of the A-axis.

$EA2k=(CL2k-PO2k)\cdot VA2k$ $ER2k=(CL2k-PO2k)\cdot VR2k$ $ET2k=(CL2k-PO2k)\cdot VT2k$ [Math. 22]

Similarly to the C-axis arc measurement, respective direction component errors can be expressed using respective Fourier coefficients by the following formulas, where A0A2, A1A2, and B1A2 denote Fourier coefficients of axial direction components, A0R2, A1R2, and B1R2 denote Fourier coefficients of radial direction components, and A0T2, A1T2, and B1T2 denote Fourier coefficients of tangential direction components. By solving the formulas as simultaneous equations of na pieces of formulas in the respective directions, the arc errors in the respective directions in the A-axis arc measurement can be obtained.

$EA2k=A0A2+A1A2*\cos \alpha ck+B1A2*\sin \alpha ck$ $ER2k=A0R2+A1R2*\cos \alpha ck+B1R2*\sin \alpha ck$ $ET2k=A0T2+A1T2*\cos \alpha ck+B1T2*\sin \alpha ck$ [Math. 23]

In S9-3, rotation axis errors, namely, center position errors (position errors) and inclination errors of the rotation axes are obtained from the arc errors in the respective directions obtained in S9-2.

Relationships of the arc errors in the respective directions obtained in S9-2 with respect to a C-axis center position X-direction error dXca, an offset error between the C-axis and the A-axis dYca, an A-axis center position Y-direction error dYax, an A-axis center position Z-direction error dZax, an A-axis angular offset error dAca, a squareness between the C-axis and the A-axis dBca, a squareness between the A-axis and the Z-axis dBax, and a squareness between the A-axis and the Y-axis dCax are expressed by the following formulas. Here, Zc is a center Z position of the sphere Q5 with respect to the A-axis center in the C-axis arc measurement, Rc is a turning radius of the sphere Q5 in the C-axis arc measurement, and Ra is a turning radius of the sphere Q5 in the A-axis arc measurement.

$A1R1=-dXca-Zc*dBax$ $B1R1=-dYca-dYax+Zc*dAca$ $A1R2=-dYax$ $B1R2=-dZax$ $A1A1=Rc*(dBca+dBax)$ $B1A1=-Rc*dAca$ $A1A2=-Ra*dCax$ $B1A2=-Rc*dBax$ [Math. 24]

By solving Math. 24, the geometric errors of the rotation axes can be obtained. Since the identified geometric errors of the rotation axes are identified by removing the influence of the geometric errors of the linear axes alone, they can be identified more accurately than a conventional method.

Thus, the error identification method, a non-transitory computer-readable storage medium storing an error identification program for performing the method, and the five-axis-control machining center of the above-described configuration perform the preparing step S1, the initial position measuring step S2, the reference angle calculating step S3, the calibrator measuring steps S5 to S7, and the error identifying steps S8 and S9. In the preparing step S1, the touch trigger probe 10 (position measurement sensor tool) is mounted on the spindle head 2 (spindle), and the ball array 11 (calibrator) having the five spheres Q1 to Q5 is secured on the table 3. In the initial position measuring step S2, the initial position of the ball array 11 is measured with the touch trigger probe 10. In the reference angle calculating step S3, the reference angles of the A-axis and the C-axis (rotation axes) for positioning the ball array 11 to the reference position are calculated using the measured value in the initial position measuring step. In the calibrator measuring steps S5 to S7, the A-axis and the C-axis are each indexed to a plurality of indexed angles with respect to the reference angles, and the center positions of the spheres Q1 to Q5 of the ball array 11 secured on the table 3 at the respective indexed angles are each measured with the touch trigger probe 10. In the error identifying steps S8 and S9, based on the measured values in the calibrator measuring steps, the positioning errors and the straightness errors of the X-axis, the Y-axis, and the Z-axis and the squareness errors between the respective axes, and the positioning errors and the inclination errors of the A-axis and the C-axis are identified.

With the configuration, the single axis geometric errors, namely, positioning errors and straightnesses of the X-axis, the Y-axis, and the Z-axis and the inter-axis geometric errors, namely, squarenesses between the X-axis, the Y-axis, and the Z-axis, center errors of the C-axis and the A-axis, and inclination errors of the C-axis and the A-axis can be simultaneously identified. Accordingly, the accurate identification of the inter-axis geometric errors is allowed without being affected by the single axis geometric errors of the linear axes.

Furthermore, by exploiting the C-axis and the A-axis of the five-axis-control machining center, a sequence of measurements can be automatically performed, and the identification of the single axis geometric errors and the inter-axis geometric errors of the linear axes can also be automatically performed without knowledge and measurement skills of a machine operator.

As a position measurement sensor tool, a tool other than the touch trigger probe can be used. A calibrator other than the ball array of the above-described configuration can be employed. For example, the number of the spheres may be three or more.

The five-axis-control machine tool is not limited to the machining center of the above-described configuration.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An error identification method for identifying an error of a five-axis-control machine tool that includes a spindle rotatable with a tool mounted thereon, a table configured to secure a workpiece and/or a jig, three linear axes orthogonal to one another and configured to relatively move the spindle with respect to the table, and two rotation axes configured to turn and/or incline the table, wherein the error identification method comprises:

mounting a position measurement sensor tool on the spindle and securing a calibrator having three or more spheres on the table;

measuring an initial position of the calibrator with the position measurement sensor tool;

calculating a reference angle of each of the rotation axes for positioning the calibrator to a predetermined reference position using a measured value in the measuring of the initial position of the calibrator;

indexing each of the rotation axes to a plurality of indexed angles with respect to the reference angle followed by measuring a center position of a sphere of the calibrator secured on the table at each of the indexed angles with the position measurement sensor tool; and identifying a positioning error and a straightness error of two of the linear axes, three squareness error between the respective linear axes, a scaling component of a positioning error of one of the linear axes other than the two of the linear axes, and a position error and an inclination error of each of the rotation axes based on a measured value in the measuring the center positions of the sphere of the calibrator.

2. The error identification method for the five-axis-control machine tool according to claim 1, wherein the measuring of the center positions of the sphere of the calibrator includes, while one of the rotation axes is indexed to given indexed angles, the other of the rotation axes is indexed to a plurality of indexed angles sequentially such that a sphere of the calibrator draws an arc trajectory, measuring each center position of at least one sphere of the calibrator secured on the table at each of the plurality of indexed angles of the other of the rotation axes.

3. The error identification method for the five-axis-control machine tool according to claim 1, wherein the measuring of the center positions of the sphere of the calibrator includes:

indexing each of the rotation axes such that a direction of the calibrator is parallel to each of axis lines of two of the linear axes followed by measuring each center position of three or more spheres of the calibrator secured on the table at each angles of indexed rotation axes with the position measurement sensor tool; and indexing each of the rotation axes such that a direction of the calibrator is in a diagonal direction of a plane formed by axis lines of two of the linear axes followed by measuring center positions of the three or more spheres of the calibrator secured on the table at each angles of indexed rotation axes with the position measurement sensor tool.

4. The error identification method for the five-axis-control machine tool according to claim 1, wherein the measuring of the center positions of the sphere of the calibrator includes:
  indexing each of the rotation axes such that a direction of the calibrator is parallel to each of axis lines of two of the linear axes followed by measuring each center position of three or more spheres of the calibrator secured on the table at each angles of indexed rotation axes with the position measurement sensor tool; and
  indexing each of the rotation axes such that a direction of the calibrator is in a diagonal direction of a space formed by axis lines of the three linear axes followed by measuring each center position of the three or more spheres of the calibrator secured on the table at each angles of indexed rotation axes.

5. A non-transitory computer-readable storage medium storing an error identification program for causing a numerical control unit of the five-axis-control machine tool to perform the error identification method for the five-axis-control machine tool according to claim 1, wherein
  the five-axis-control machine tool includes a spindle rotatable with a tool mounted thereon, a table configured to secure a workpiece and/or a jig, three linear axes orthogonal to one another and configured to relatively move the spindle with respect to the table, and two rotation axes configured to turn and/or incline the table.

* * * * *